United States Patent [19]

Godfroid

[11] Patent Number: 4,536,692
[45] Date of Patent: Aug. 20, 1985

[54] CIRCUIT FOR ENERGIZING AND CONTROLLING A SYNCHRONOUS ROTARY MACHINE OPERATING AT VARIABLE SPEED

[75] Inventor: Henri Godfroid, Valdoie, France

[73] Assignee: CGEE Alsthom, France

[21] Appl. No.: 622,400

[22] Filed: Jun. 21, 1984

Related U.S. Application Data

[63] Continuation of Ser. No. 468,623, Feb. 22, 1983, abandoned.

[51] Int. Cl.$^3$ ............................................. H02P 5/40
[52] U.S. Cl. .................................... 318/723; 318/803
[58] Field of Search ............ 318/723, 803, 807–811; 363/71, 72, 43; 307/82

[56] References Cited

U.S. PATENT DOCUMENTS

| | | | |
|---|---|---|---|
| 3,970,914 | 7/1976 | Salzmann et al. | 318/812 |
| 4,008,428 | 2/1977 | Waldmand et al. | 318/807 |
| 4,172,991 | 10/1979 | Akamatsu et al. | 318/798 |
| 4,349,772 | 9/1982 | Weiss | 363/71 |
| 4,392,099 | 7/1983 | Kuniyoshi | 318/803 |
| 4,424,475 | 1/1984 | Godfroid | 318/803 |

OTHER PUBLICATIONS

Murphy, J. M. D. *Thyristor Control of A.C. Motors*, Pergamon Press, 1973, pp. 82–83.

*Primary Examiner*—David Smith, Jr.
*Attorney, Agent, or Firm*—Sughrue, Mion, Zinn, Macpeak, and Seas

[57] ABSTRACT

A circuit for energizing and controlling a synchronous rotary machine which operates at variable speed and is fed by controlled static switches, wherein the stator of the rotating machine has a plurality n of polyphase windings where n is at least equal to two, each polyphase winding being fed by a static AC-AC converter (A, B) which constitutes an autosychronous inverter having a mains bridge (PRA, PRB) and a machine bridge (PMA, PMB) connected to each other by first and second DC conductors, and wherein the circuit has means for controlling the mains bridge of each converter in such a way that the sum of the DC currents (IA+IB) in said conductors of all the converters is proportional to a reference average current value.

5 Claims, 3 Drawing Figures

plied to n summing circuits each of which feeds a respective pulse control circuit of one of the n mains bridges, each summing circuit further receiving a full inverter firing signal and the output from a current regulator circuit for the corresponding one of the n converters.

Advantageously, the stator of the rotating machine has two three-phase windings at 30° to each other.

BRIEF DESCRIPTION OF THE DRAWINGS

The invention will be better understood from the description of an embodiment given hereinafter with reference to the accompanying drawings in which.

MORE DETAILED DESCRIPTION

Figure 1:
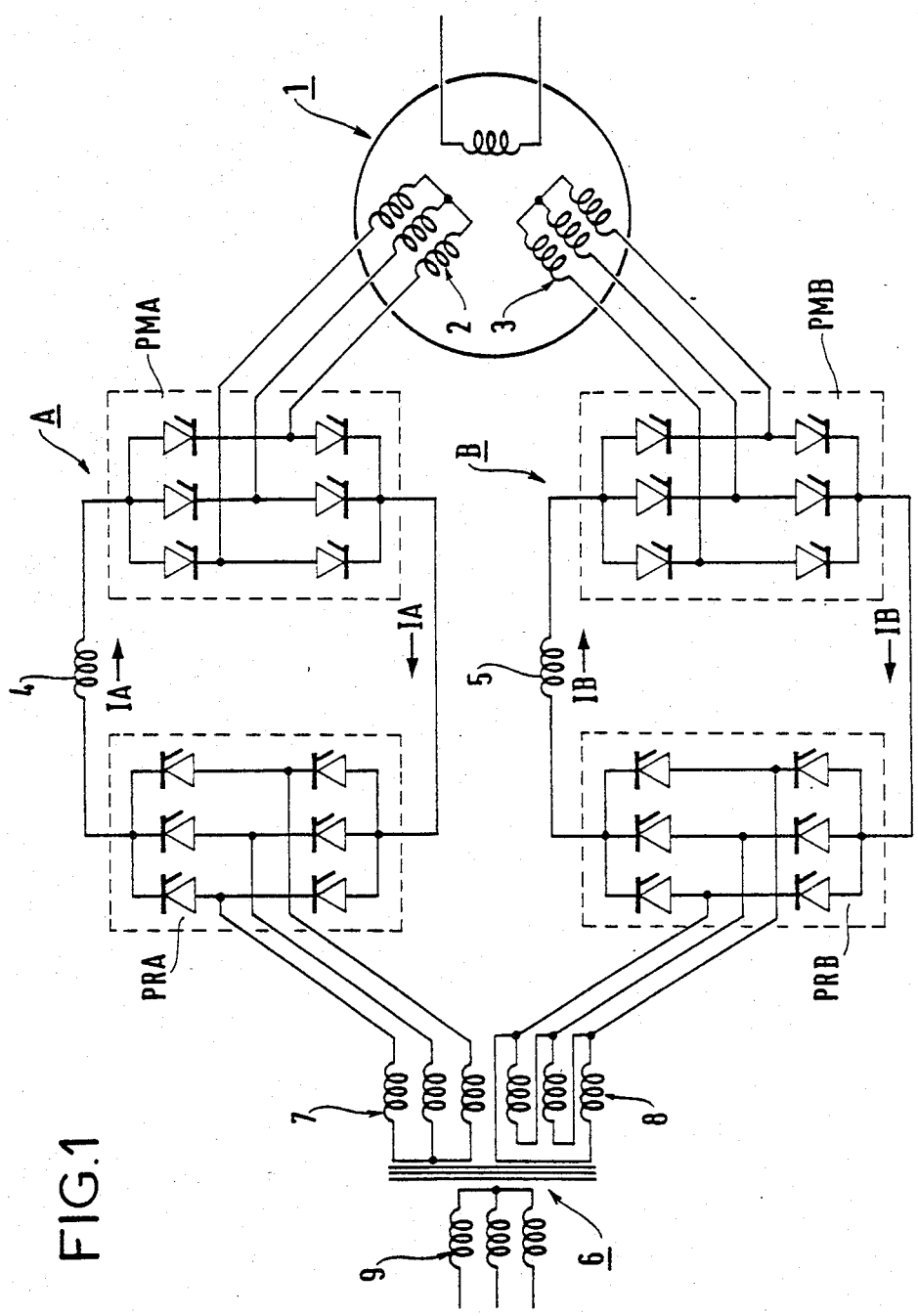
FIG. 1 is a circuit diagram of the feed circuit of a synchronous rotating machine having two three-phase stator windings.

As illustrated in FIG. 1, the circuit includes a synchronous motor 1 having two three-phase stator windings 2 and 3 at an angle of 30° relative to each other. Each stator winding is energized by a static converter: a converter A for the winding 2 and a converter B for the winding 3. The converter A has a mains bridge PRA and a machine bridge PMA and the converter B has a mains bridge PRB and a machine bridge PMB. All these bridges are three-phase thyristor bridges. The converter A further includes a loop induction winding 4 and the converter B includes loop induction winding 5. The mains bridges PRA and PRB are both energized from a transformer 6 having two secondary windings 7 and 8 and one primary winding 9. The secondary winding 7 is star-connected and the secondary winding 8 is delta-connected so as to suppress the harmonics of fifth and seventh orders.

Figure 2:
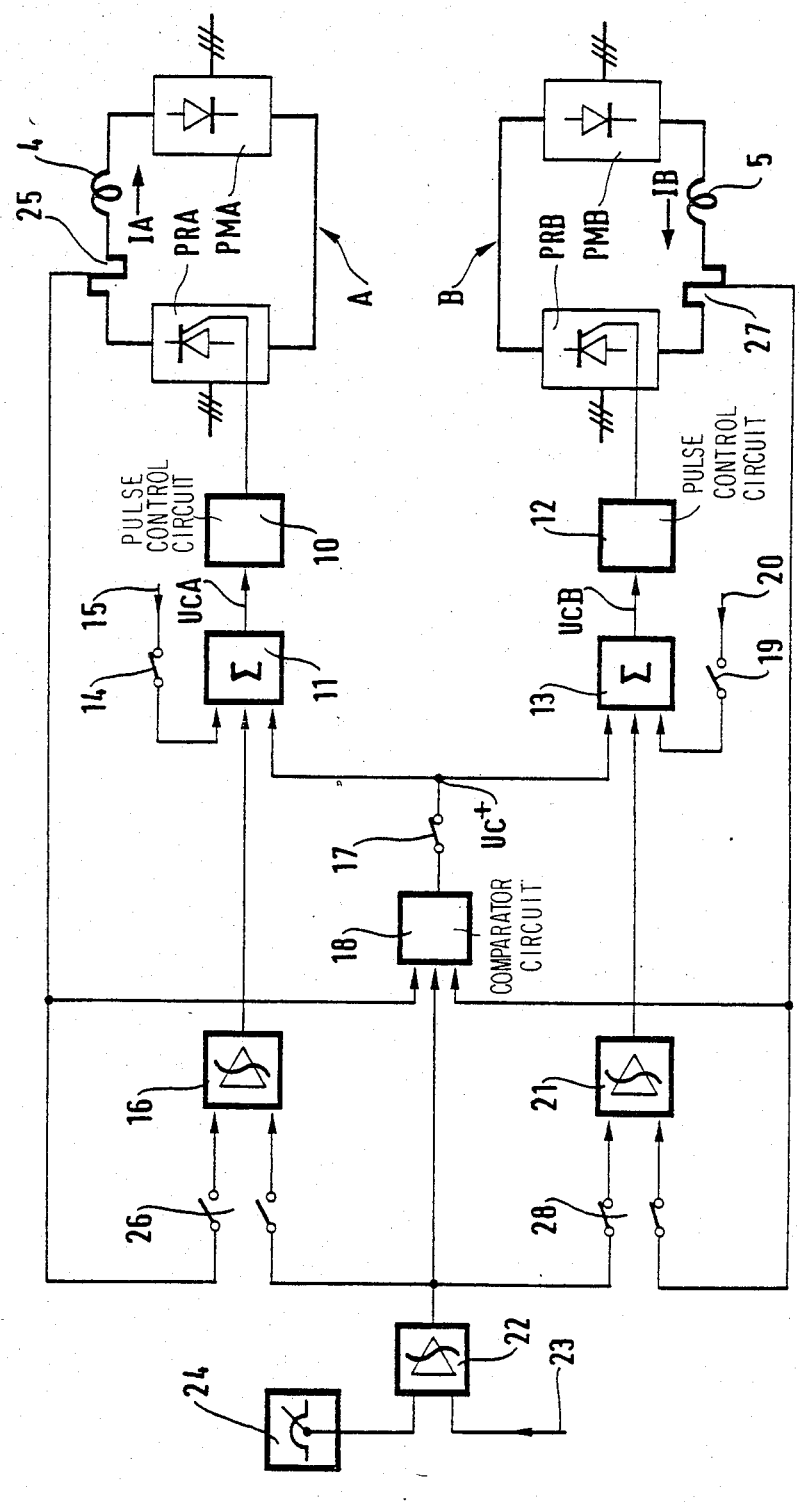
FIG. 2 is a block diagram of control means for the feed circuit shown in FIG. 1.

Each converter operates under its own logic programme in sequential mode and, in accordance with the invention, the control means illustrated in FIG. 2 reduces torque pulses by compensating the loss of torque caused when the current IA or IB passes through zero in the converter whose machine bridge thyristors switching on by causing a concomitant increase of the current in the other converter which remains conductive.

In FIG. 2, converters A and B are represented in a simplified manner. The mains bridge PRA is controlled by a pulse control circuit 10 which receives a control voltage $U_cA$ delivered by a summing circuit 11 and the mains bridge PRB is controlled by a pulse control circuit 12 which receives a control voltage $U_cB$ delivered by a summing circuit 13.

The summing circuit 11 has three inputs: the first of which receives a full-inverter firing signal from the mains bridge PRA via a conductor 15, and a gate 4; the second of which receives the output signal from a regulator 16 for regulating the current IA which flows in the DC loop of the converter A; and the third of which is connected via a gate 17 to a comparator circuit 18. Likewise, the summing circuit 13 also has three inputs: the first of which receives a full-inverter firing signal from the bridge PRB via a conductor 20 and a gate 19; the second of which receives the output signal from a regulator 21 for the current IB which flows in the DC loop of the converter B; and the third of which is connected to the comparator circuit 18 via the gate 17.

The comparator 18 compares the sum of the currents IA+IB to an average current reference signal generated by a speed regulator 22. The output signal from the comparator 18 is proportional to the difference between said average current reference signal and the sum of the currents IA+IB. The speed regulator 22 generates an output signal based firstly on the measured speed of the synchronous machine 1, (an image signal of said speed being applied in an input 23) and secondly on a speed reference signal generated by a circuit 24. The average current reference signal generated by the speed regulator 22 is also applied to one input of the regulator 16 for the current IA which also receives a signal representative of the current IA which signal is taken from a current sensing resistor 25. These two signals are applied to the regulator 16 by a gate 26. Likewise, the output signal from the speed regulator 22 is also applied to one input of the regulator 21 for the current IB which is measured using a resistor 27. These two signals are also applied to two inputs of the regulator 21 by a gate 28.

The circuit operates as follows:

1—When the machine bridge PMA switches: the gates 14, 17 and 28 are closed and the gates 19 and 26 are open.

The bridge PRA is full-inverter fired by sending the full-inverter firing signal via the conductor 15 to an input of the summing circuit 11. The bridge PRB receives a signal $U_c+$ coming from the comparator circuit 18 to control a rise in the current IB which rise compensates the momentary disappearance of the current IA.

The IB current regulator 21 is operating while the IA current regulator 16 is prevented from operating by opening the gates 26 in its reference signal input and its current-measuring input. The regulator maintains the state of its output such as is was before the switching instant and resumes normal operation at the end of switching; the signal $U_cA$ at the output of the circuit 11 thus resumes the value it had at the instant when the machine bridge PMA began to switch.

The signal $U_c$ is generated by the comparator 18 which compares the sum of the instantaneous currents IA+IB with the average reference current signal coming from the circuit 22.

2—When the machine bridge PMB switches: the gates 19, 26 and 17 are closed and the gates 14 and 28 are open; operation is symmetrical to the case set forth above. In FIG. 2, the gates are shown in their states corresponding to the bridge PMA switching.

The circuit may also be applied to stator windings having a number of phases other than three and also to cases where there are more than two stator windings.

Figure 3:
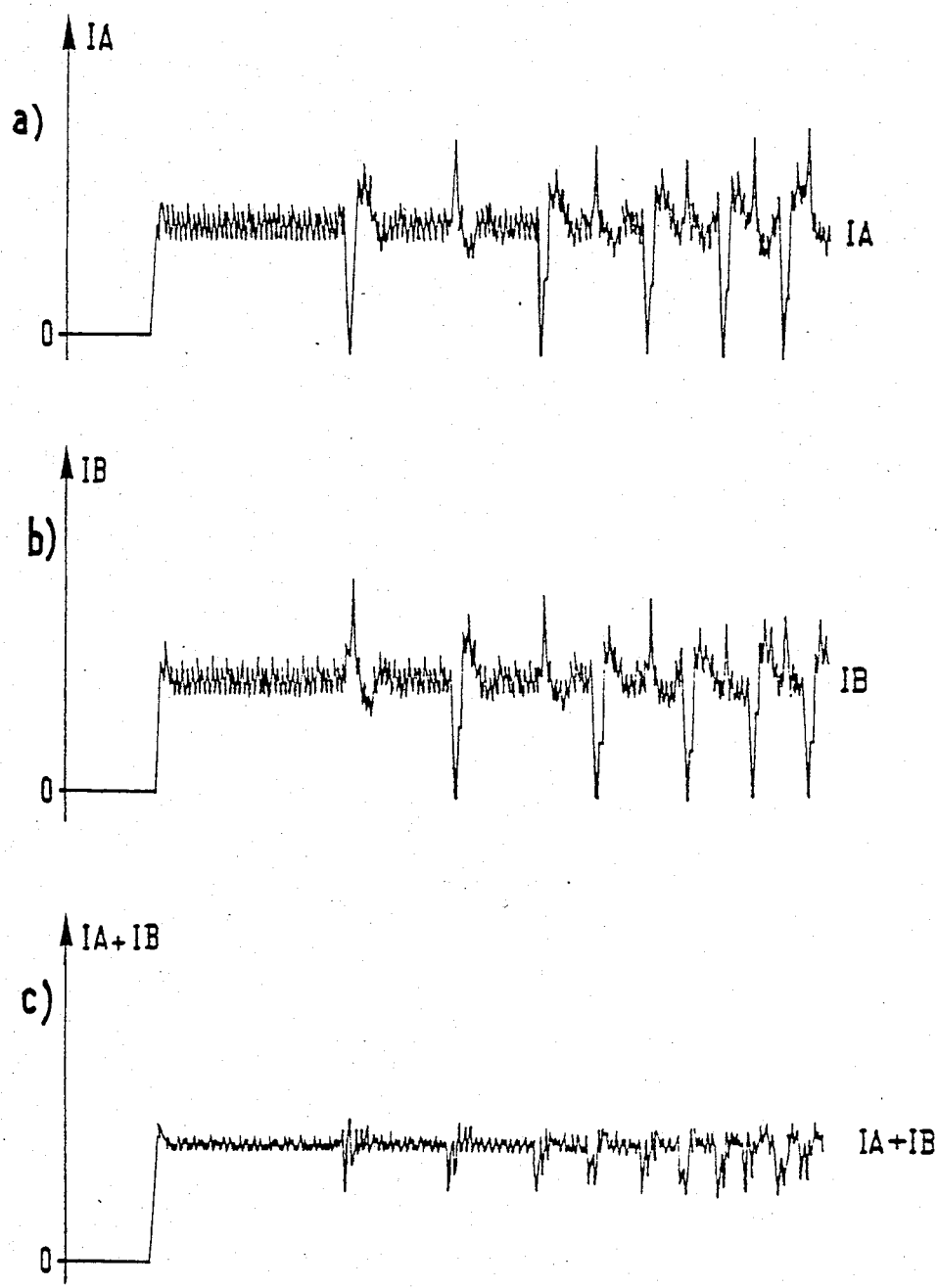
FIG. 3 is a waveform diagram showing various currents.

FIG. 3 is a waveform diagram of the currents; the current IA is illustrated in waveform A, the current IB is illustrated in waveform B and the sum of the currents IA+IB is illustrated in waveform C. It is observed that when one of the currents IA or IB passes through zero, the other current is increased by a quantity such that the sum of the currents IA+IB is substantially equal to $\sqrt{3}$ sum of the currents IA+IB is substantially equal to $\sqrt{3/2}$ the average value of IA+IB outside these change-of-conduction periods. The electro-magnetic torque of the machine is thus made practically constant.

I claim:

1. A circuit for energizing and controlling a synchronous rotary machine which operates at variable speed, said machine having a stator with a plurality of n polyphase windings wherein n is at least equal to two, said circuit comprising:

a polyphase AC source of n phases corresponding in number of the n polyphase windings of said machine, controlled static switches comprising a static AC-AC converter for feeding each polyphase winding, each said converter constituting an autosynchronous inverter comprising a polyphase mains bridge and a polyphase machine bridge connected to each other by first and second DC conductors forming a continuous current loop such that one of said bridges operates as a rectifier and the other bridge operates as an inverter, each of said bridges having n parallel paths with paired thyristors within each of said parallel paths, and wherein said polyphase AC source is connected to said polyphase mains bridge at points between said paired thyristors for respective phases, and said n polyphase windings of said machine stator are connected to respective paths of said polyphase machine bridge at points between said paired thyristors for respective phases thereof, and wherein the circuit includes monitoring means for monitoring the sum of the currents flowing in each loop, and control means for controlling the mains bridge of each converter such that the sum of the DC currents in said conductors of all the converters is proportional to a reference average current value.

2. A circuit according to claim 1, wherein said control means includes a speed regulator for supplying a reference average current value, a comparator circuit for comparing said average current value with said sum of the DC currents, means for applying the output of said comparator to an summing circuits, each of which feeds a respective pulse control circuit of one of the n mains bridges, and means for supplying to each summing circuit a full inverter firing signal and the output from a current regulator circuit for the corresponding one of the n converters.

3. A circuit according to claim 2, wherein the stator of the rotating machine has two three-phase windings at 30° to each other.

4. A circuit according to claim 1, wherein said control means includes means for controlling each mains bridge to provide a substantially constant DC current in each loop independently of the rotational position of said rotatory machine, with the current in each loop exhibiting a transient decrease during switching of thyristors in the respective mains bridge, said control means responding to a detected decrease in the current in one of said loops for increasing the current in at least one remaining loop to maintain said sum of DC currents proportional to said reference average current value.

5. A circuit according to claim 2, wherein said control means includes switch means for disabling the current regulator circuit coupled to any given summing circuit while a full inverter firing signal is being supplied to said given summing circuit and for again enabling the disabled current regulator circuit when said full inverter firing signal is no longer supplied to said given summing circuit, whereby the level of the output signal provided by said current regulator circuit immediately prior to its disabling and immediately after its again enabling will be substantially uneffected by the loop current during application of said full inverter firing signal to said given summing circuit.

* * * * *